United States Patent [19]

Wilson et al.

[11] 4,065,800
[45] Dec. 27, 1977

[54] TAPE CASSETTE PLAYER

[75] Inventors: James R. Wilson, Kokomo; Jerry P. Wise, Peru, both of Ind.

[73] Assignee: General Motors Corporation, Detroit, Mich.

[21] Appl. No.: 777,964

[22] Filed: Mar. 16, 1977

[51] Int. Cl.² ............................................ G11B 15/24
[52] U.S. Cl. ..................................... 360/137; 360/96; 242/198
[58] Field of Search ................... 360/96, 92, 130, 105, 360/137; 242/199, 200, 198

[56] References Cited

U.S. PATENT DOCUMENTS

| 3,902,193 | 8/1975 | Hapke | 360/96 |
| 3,904,149 | 9/1975 | Suzuki | 242/198 |
| 3,926,387 | 12/1975 | Hirabayashi | 242/198 |
| 3,945,040 | 3/1976 | Staar | 360/137 |
| 3,959,821 | 5/1976 | Nardino | 360/96 |

Primary Examiner—John H. Wolff
Attorney, Agent, or Firm—Warren D. Hill

[57] ABSTRACT

A compact tape cassette player includes a base member defining a channel for slidably receiving a cassette, and a tape transport assembly mounted on a support plate which moves vertically relative to the base plate for engagement and disengagement with a cassette. A lever assembly normally holds the support plate in a raised inoperative position but when the lever assembly is moved against a spring force to an operative position upon insertion of the cassette it allows the support plate to drop into driving engagement with the cassette and latch the lever assembly in the operative position. An eject slide is manually operable to cam the support plate to an inoperative position whereupon the lever assembly is released to eject the cassette.

4 Claims, 5 Drawing Figures

TAPE CASSETTE PLAYER

This invention relates to a tape cassette player.

It is desirable to build a cassette tape player and/or recorder as compact as possible at moderate expense and this is especially desirable for such a device to be installed in the instrument panel of a automative vehicle where space is at a premium. In such applications, it is also desirable to load a cassette into the player by a generally horizontal sliding motion. It is necessary upon such sliding insertion that a driving capstan and drive spindles be laterally (or vertically) inserted into appropriate apertures of the tape cassette. Previously such engagement of the tape transport assembly with the cassette has been carried out by a swinging motion which requires undesirable vertical space in the tape player or by an angular motion having a fore and aft component which requires undesirable depth of the cassette player. It has been determined that where horizontal insertion of the tape cassette is used, a vertical tape transport motion is most economical of space usage. It is further desirable that the insertion of the cassette automatically effects driving engagement of the cassette by tape transport assembly.

It is therefore a general object of this invention to provide a tape cassette player having a tape transport assembly move into operative position in a direction perpendicular to the path of cassette insertion and a space saving mechanism responsive to cassette insertion for automatically actuating the tape transport engaging motion.

The invention is carried out by providing a tape transport assembly supported for movement perpendicular to a base plate and biased toward the base plate, a cassette receiving chamber in the base plate for receiving a tape cassette slideably inserted parallel to the base plate, a lever assembly having a pair of levers engaged by the tape cassette and moved against a spring force upon cassette insertion and including an abutment engageable with the tape transport assembly for holding the tape transport assembly in inoperative position until tape cassette insertion whereupon the abutment is moved perpendicular to allow movement of the transport assembly toward the base plate into driving engagement with the tape cassette, and a slide eject member which is manually slideable to cam the tape transport assembly out of its driving engagement with the tape cassette and to release the lever assembly spring force to cause a cassette eject motion of the lever assembly.

The above and other advantages will be made more apparent from the following specification taken in conjunction with the accompanying drawings wherein like reference numerals refer to like parts and wherein.

Figure 1:
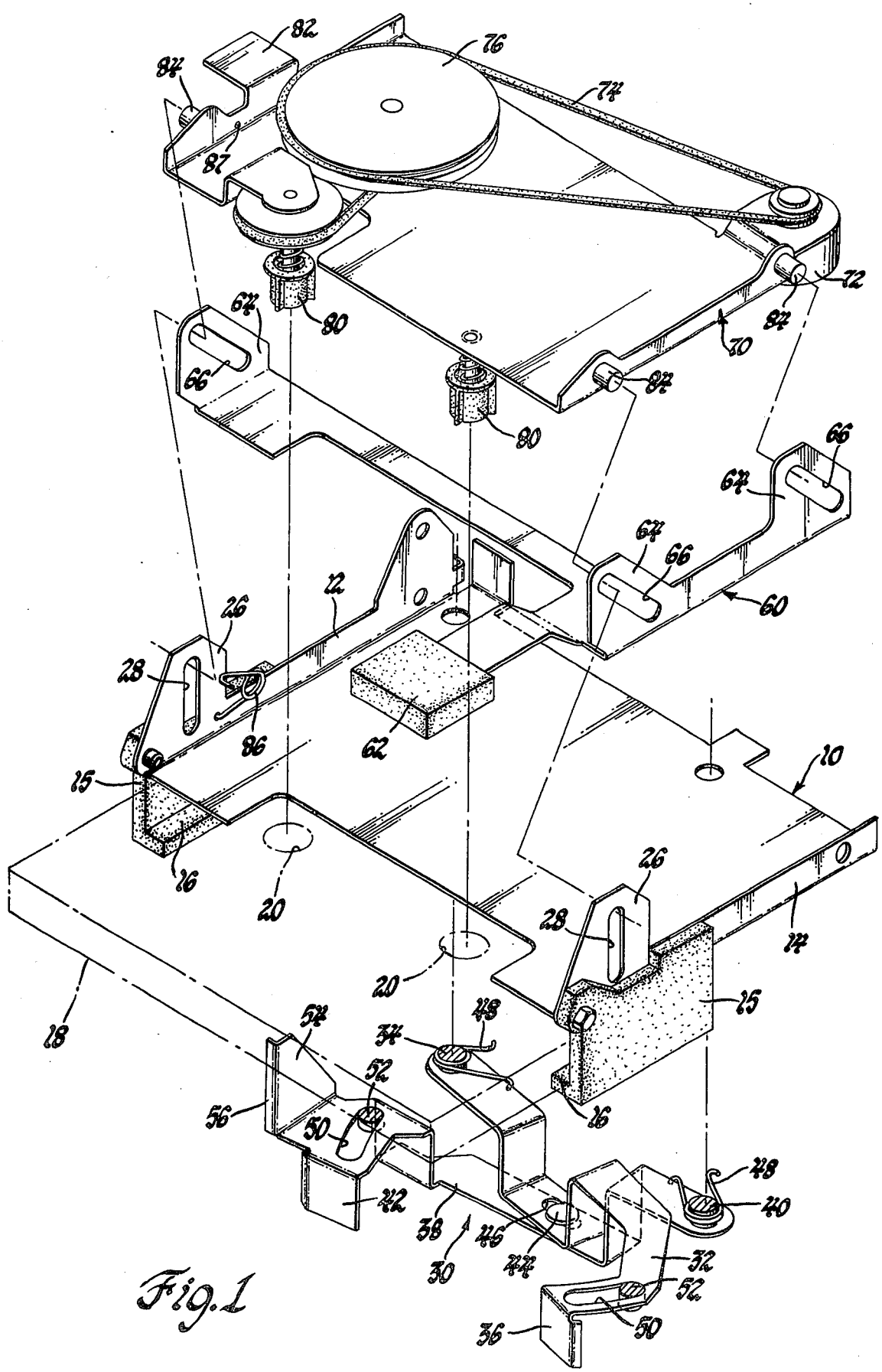
FIG. 1 is an exploded perspective view of a tape cassette player according to the invention.

In the following description, it is assumed that the tape cassette player is operative in any orientation but for convenience of description reference to vertical directions are those apparent in the drawings while "forward" means the direction of cassette insertion.

Referring to FIG. 1, a tape cassette player includes a horizontal base plate 10 bounded on two opposed sides by side walls 12 and 14. Cassette guides 15 are secured to the sidewalls and have at their lower ends flanges 16 turned inwardly toward each other and lying in a plane parallel to and spaced from the base plate 10 to define a channel or chamber for slideably receiving a tape cassette 18. The tape cassette is of a conventional variety having reel driving apertures 20 and a capstan aperture for receiving drive spindles and a capstan respectively. The side walls 12 and 14 include upper extensions 26 containing guide slots 28 perpendicular for the plane of the base plate 10. While two guide slots are desirable, in principle only one is necessary to constrain the support plate to vertical motion.

Figure 2:
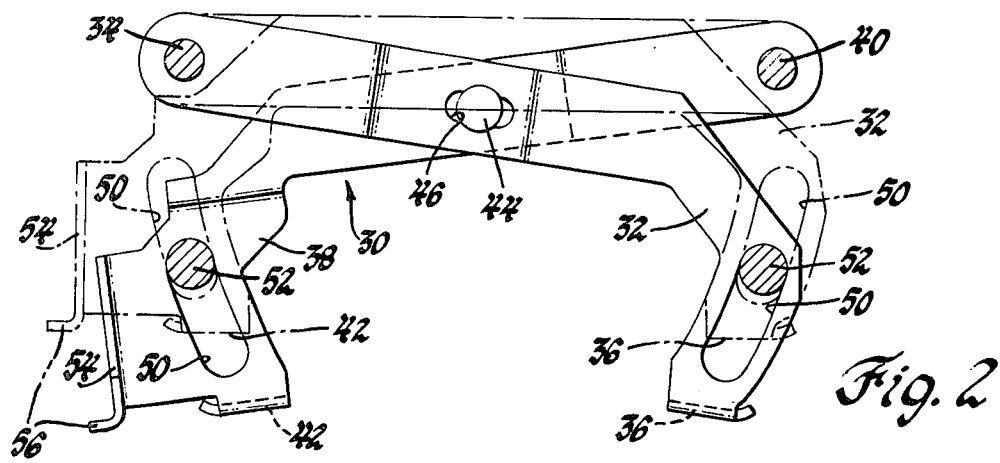
FIG. 2 is a plan view of the lever assembly of FIG. 1.

As best shown in FIGS. 1 and 2, a lever assembly 30 is mounted beneath the base plate 10 adjacent to the cassette chamber. The lever assembly includes a right eject lever 32 pivotally connected by a pin 34 at the left side of the base plate at one end and extending across to the right side of the base plate and terminating in a down turned cassette contact tab 36. The right hand end of the lever 32 curves rearwardly toward the cassette chamber to actually extend into the cassette chamber while in an inoperative position as shown in solid lines in FIG. 2 but movable by the cassette to an operative position shown in broken lines. A left eject lever 38 has one end pivoted to the right side of the base plate by a pin 40 and its left end terminating in a cassette contact tab 42 which is extendable into the cassette chamber like the lever 32. The levers are coupled at their crossover point by a pin 44 connected to one of the levers and extending through a slot 46 in the other of the levers thereby forming a cross linkage. Alternatively the levers might be coupled by a fixed pivot and their ends pivoted in slots to form a scissors configuration. The lever assembly assures that the cassette upon insertion into the chamber will contact two widely spaced points, i.e. contact tabs 36 and 42 which are symmetrically located and which upon urging by the cassette, travel in unison to insure that the cassette is stably supported and does not become cocked and bind in the chamber. Each lever is biased rearwardly by a wrapped spring 48 to the inoperative position wherein the contact tabs 36 and 42 extend into the cassette chamber. The free ends of each lever includes an arcuate slot 50 which receives a pin 52 depending from the base plate and which pin supports a snap ring or other fastener adjacent to the lever to provide vertical stability to the lever while allowing free pivotal motion thereof. The left eject lever 38 includes an abutment arm 54 extending beyond the side wall 12 and terminating in a vertical upper portion extending above the base plate 10. The rear edge of the arm terminates in an outwardly turned flange 56.

As further seen in FIG. 1, an eject slide 60 is dimensioned to nest between the side walls 12 and 14 atop the base plate 10 for sliding fore and aft parallel to the base plate. A push button 62 extends rearwardly of the base plate for manual operation. The eject slide includes two upstanding ear portions 64 penpendicular to the base plate 10 on the right side thereof and one such ear portion 64 on the left side thereof. Each ear portion contains a slot 66 positioned at about a 45° angle with the highest end of each slot being toward the rear.

A support plate 70 carries a tape transport assembly including tape drive means comprising a motor 72, belt 74, a belt driven pulley-flywheel 76 driving a capstan 78 (FIG. 3) and a pair of cassette drive spindles 80 driven from the motor by means which are well known in the art. A lateral extension or latching plate 82 on the left side of the support plate 70 projects outwardly thereof. Three guide pins 84 extend laterally from the support plate 70 such that when assembled each guide pin extends through a slot 66 of the eject slide and in addition to the left guide pin and the right rear guide pin 84 extend through the vertical guide slot 28. Thus the support plate 70 is stably held in a given vertical position by the three angled slots 66 when the eject slide is in its forward position, and when the eject slide moves horizontally the support plate moves vertically, being constrained by the vertical guide slot 28, and remains horizontal. The support plate 70 is biased toward the base plate 10 by the wrapped spring 86 which engages hole 87 in the support plate.

Figure 3:
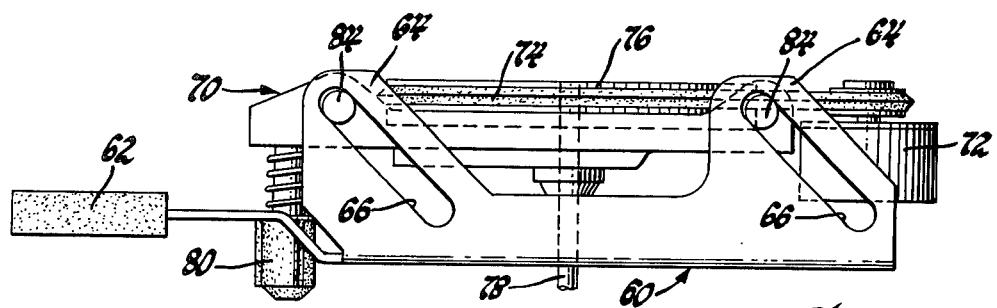
FIG. 3 is a right side view of the assembly of the support plate and the eject slide member of FIG. 1.

FIG. 3 shows a right side view of the assembled eject slide and support plate. As shown, the eject slide 60 is in the inoperative or eject position which it assumes when push button 62 is depressed so that the angled slots 66 hold the support plate 70 in its raised or inoperative position by camming the pins 84 upwardly. When, however, the eject slide 60 is moved to its outer position, the guide pins 84 will then reside at the bottom of the slots 66 and the support plate will then be in the lowered or operative position to allow engagement of the capstan and drive spindles 80 with the tape cassette.

Figure 4:
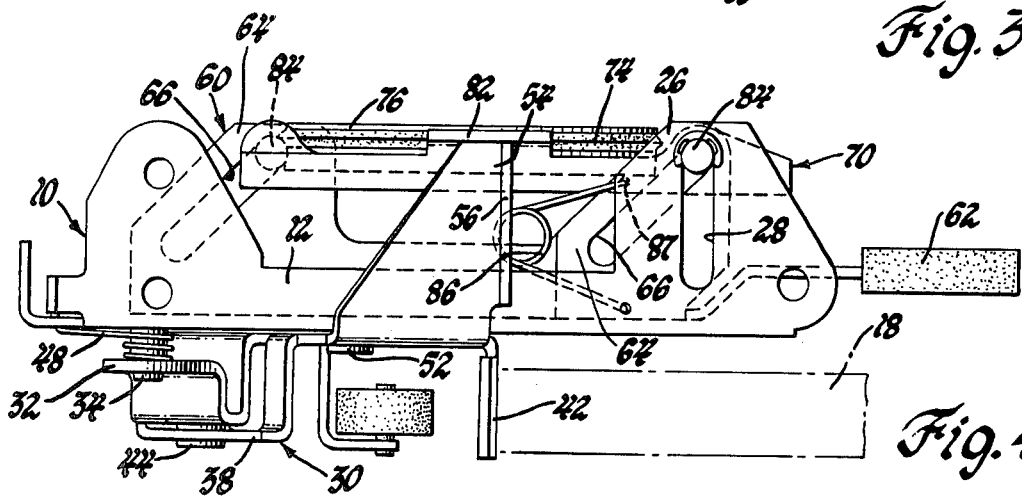
FIGS. 4 and 5 are left side views of the assembly of FIG. 1 with the left cassette guide removed.

In FIG. 4 which is a left side view of the cassette player with a cassette guide 15 removed, the device is in its inoperative position with the tape cassette 18 only partially inserted and in contact with the tab 42 of the left lever 38. The support plate is in its upper position and the extension or latching plate 82 thereof rests atop the abutment arm 54. Thus the purpose of the arm 54 is to maintain the support plate in its upper position against the bias of the spring 86.

Figure 5:
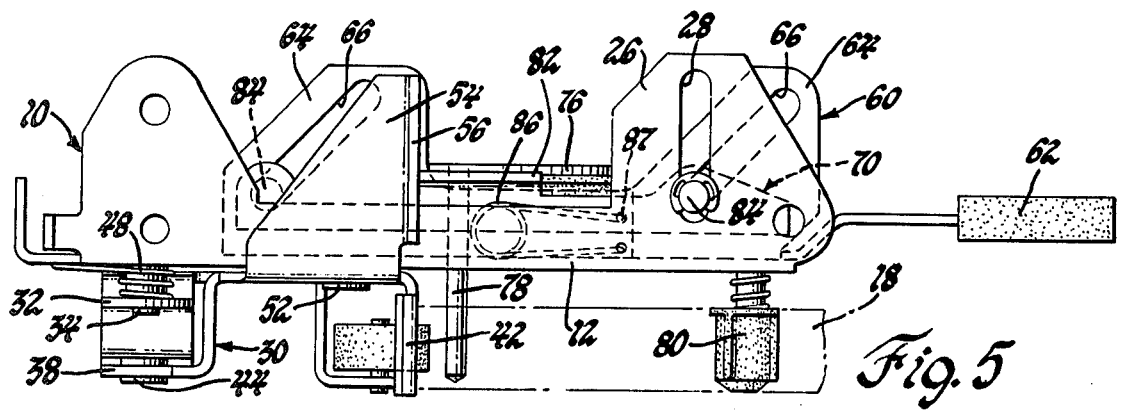

FIG. 5 is a view like that of FIG. 4 except that the support plate is in its operative or lower position. The tape cassette 18 is inserted all the way into its chamber and the contact tab 42 has been pushed back carrying with it the arm 54 and flange 56 to a point beyond the front edge of the latching plate 82 so that the support plate is released just when the apertures on the tape cassette are vertically aligned with the spindles 80 and the capstan 78 which then drops down and engages the tape cassette 18. The guide pins 84 traveling in the vertical guide slots 28 assure that the movement of the support plate is perpendicular to the base plate. The downward movement of the guide pins 84 acting on the angled slots 66 pushes the eject slide 60 to the rear. The insertion of the tape cassette 18 causes a forward movement of the levers 32 and 38 and loads the springs 48. The latching plate 82 then abuts the flange 56 to prevent the lever assembly from moving back so long as the support plate is in operative position. When the push button 62 is manually shifted to push the eject slide 60 forward, the slide assumes the position shown in FIG. 4 whereupon the guide pins 84 and the support plate are cammed upwardly. When the latching plate 82 clears the top of the flange 56 on the arm 54, the lever assembly is released causing the levers to move rearwardly under the action of the springs 48 to eject the cassette 18.

It will thus be seen that a relatively inexpensive mechanism provides for a short vertical travel of a tape transport mechanism for engagement with a tape cassette and that engagement with the cassette is actuated automatically upon cassette insertion. Moreover, the apparatus upon manual operation of an eject push button returns the device to inoperative position and ejects the tape cassette.

The embodiments of the invention in which an exclusive property or privilege is claimed are defined as follows:

1. A tape cassette player comprising, a base member having guide means defining a chamber having an axis for slidably receiving a tape cassette movable along the axis, a tape transport assembly including tape drive means, means supporting said tape transport assembly for movement perpendicular to the said axis between a tape drive position wherein said tape drive means projects into said chamber for driving engagement with said tape cassette and an inoperative position spaced from said tape cassette, spring means for biasing said tape transport assembly to said tape driving position, a manually operable eject slide supported for movement by said base member, said eject slide being operatively connected to move said tape transport assembly from said tape driving position to said inoperative position against the force of said spring means, a lever assembly comprising a pair of levers pivotally supported by said base member, the levers including cassette engaging contact elements disposed in said chamber, and coupling means interconnecting the levers to maintain the contact elements in a plane perpendicular to the said axis, resilient means connected to the lever assembly for urging said levers and said contact elements toward a first state in engagement with said cassette when said cassette is partially inserted into said chamber, said levers and contact elements being moved by engagement with said cassette against the force of the resilient means to a second state upon the complete insertion of said cassette into said chamber, abutment means carried by said lever assembly and engageable with said tape transport assembly for holding the tape transport assembly in said inoperative position when said levers are in said first state, said abutment means being disengaged from said tape transport assembly when said levers are moved to said second state whereby the tape transport assembly is moved to the said tape driving position by said spring means when a cassette is completely inserted into the chamber, and means on the tape transport assembly operative in the tape driving position for maintaining the levers in the second state, the lever assembly being released to move the said levers to the said fist state by the force of the resilient means when the tape transport assembly is moved to said inoperative position by operation of the eject slide whereby the cassette is forcibly ejected from said chamber.

2. A tape cassette player comprising, a base member having walls defining a chamber having an axis for slidably receiving a tape cassette movable along the axis, a tape transport assembly including tape drive means and having guide pins extending therefrom, means including a slot perpendicular to said axis in a portion of the base member for slidably receiving one of said guide pins for supporting said tape transport assembly for movement perpendicular to the said axis between a tape drive position wherein said tape drive means projects into said chamber for driving engagement with said tape cassette and an inoperative position spaced from said base member in which said tape drive means is disengaged from said tape cassette, spring means for biasing said tape transport assembly to said tape driving position, a manually operable eject slide supported for movement by said base member, said eject slide having at least three cam surfaces each coacting with a guide pin on the tape transport assembly to stably support said assembly and being operatively connected to move said tape transport assembly from said tape driving position to said inoperative position against the force of said spring means, a lever assembly comprising a pair of levers pivotally supported by said base member, the levers including cassette engaging contact elements disposed in said chamber, and coupling means interconnecting the levers to maintain the contact elements in a plane perpendicular to the said axis, resilient means connected to the lever assembly for urging said levers and said contact elements toward a first state in engagement with said cassette against the force of the resilient means to a second state upon the complete insertion of said cassette into said chamber, abutment means carried by said lever assembly and engageable with said tape transport assembly for holding the tape transport assembly in said inoperative position when said levers are in said first state, said abutment means being disengaged from said tape transport assembly when said levers are moved to said second state whereby the tape transport assembly is moved to the said tape driving position by said spring means when a cassette is completely inserted into the chamber, and means on the tape transport assembly operative in the tape driving position for maintaining the levers in the second state, the lever assembly being released to move the said levers to the said first state by the force of the resilient means when the tape transport assembly is moved to said inoperative position by operation of the eject slide whereby the cassette is forcibly ejected from said chamber.

3. A tape cassette player comprising, a base member having walls defining a chamber having an axis for slidably receiving a tape cassette movable along the axis, a tape transport assembly including tape drive means, means supporting said tape transport assembly for movement perpendicular to the said axis between a tape drive position wherein said tape drive means projects into said chamber for driving engagement with said tape cassette and an inoperative position spaced from said base member in which said tape drive means is disengaged from said tape cassette, spring means for biasing said tape transport assembly to said tape driving position, a manually operable eject slide supported for movement by said base member, said eject slide being operatively connected to move said tape transport assembly from said tape driving position to said inoperative position against the force of said spring means, a lever assembly comprising a pair of crossed levers each pivotally supported at one end on said base member, the levers including on the other ends thereof widely spaced cassette engaging contact elements disposed in said chamber and coupling means interconnecting the levers to maintain the contact elements in a plane perpendicular to the said axis, the coupling means comprising a pin secured to one lever at the region where the levers cross and a slot in the other lever in cooperative engagement with the pin, resilient means connected to the lever assembly for urging said levers and said contact elements toward a first state in engagement with said cassette when said cassette is partially inserted into said chamber, said levers and contact elements being moved by engagement with said cassette against the force of the resilient means to a second state upon the complete insertion of said cassette into said chamber, abutment means carried by said lever assembly and engageable with said tape transport assembly for holding the tape transport assembly in said inoperative position when said levers are in said first state, said abutment means being disengaged from said tape transport assembly when said levers are moved to said second state whereby the tape transport assembly is moved to the said tape driving position by said spring means when a cassette is completely inserted into the chamber, and means on the tape transport assembly operative in the tape driving position for maintaining the levers in the second state, the lever assembly being released to move the said levers to the said first state by the force of the resilient means when the tape transport assembly is moved to said inoperative position by operation of the eject slide whereby the cassette is forcibly ejected from said chamber.

4. A tape cassette player comprising, a base member having walls defining a chamber having an axis for slidably receiving a tape cassette movable along the axis, a tape transport assembly including tape drive means, means supporting said tape transport assembly for movement perpendicular to the said axis between a tape drive position wherein said tape drive means projects into said chamber for driving engagement with said tape cassette and an inoperative position spaced from said base member in which said tape drive means is disengaged from said tape cassette, spring means for biasing said tape transport assembly to said tape driving position, a manually operable eject slide supported for movement by said base member, said eject slide being operatively connected to move said tape transport assembly from said tape driving position to said inoperative position against the force of said spring means, a lever assembly comprising a pair of levers pivotally supported by said base member, the levers including cassette engaging contact elements disposed in said chamber, and coupling means interconnecting the levers to maintain the contact elements in a plane perpendicular to the said axis, resilient means connected to the lever assembly for urging said levers and said contact elements toward a first state in engagement with said cassette when said cassette is partially inserted into said chamber, said levers and contact elements being moved by engagement with said cassette against the force of the resilient means to a second state upon the complete insertion of said cassette into said chamber, abutment means comprising an arm integral with one of said levers and engageable with a latching plate extending from said tape transport assembly for holding the tape transport assembly in said inoperative position when said levers are in said first state, said arm being moved out of engagement with said latching plate of said tape transport assembly when said levers are moved to said second state whereby the tape transport assembly is moved to the said tape driving position by said spring means when a cassette is completely inserted into the chamber, and an edge of the said latching plate operative in the tape driving position to engage the said arm for maintaining the levers in the second state, the lever assembly being released to move the said levers to the said first state by the force of the resilient means when the tape transport assembly is moved to said inoperative position by operation of the eject slide to release the arm means from the latching plate whereby the cassette is forcibly ejected from said chamber.

* * * * *

UNITED STATES PATENT AND TRADEMARK OFFICE
CERTIFICATE OF CORRECTION

PATENT NO. : 4,065,800
DATED : December 27, 1977
INVENTOR(S) : James R. Wilson and Jerry P. Wise It is certified that error appears in the above-identified patent and that said Letters Patent are hereby corrected as shown below:

On the abstract page of the patent the title should read -- Tape Cassette Player with Double Lever Eject Mechanism --.

Column 1, line 1, the title should read -- Tape Cassette Player with Double Lever Eject Mechanism --.

Column 1, line 7, "a automative" should read -- an automotive --.

Column 2, line 10, "for" should read -- to --.

Column 2, line 46, delete "to".

Column 3, line 5, delete "to".

Column 4, claim 1, line 46, "fist" should read -- first --.

UNITED STATES PATENT AND TRADEMARK OFFICE
CERTIFICATE OF CORRECTION

PATENT NO. : 4,065,800

DATED : December 27, 1977

INVENTOR(S) : James R. Wilson and Jerry P. Wise

It is certified that error appears in the above-identified patent and that said Letters Patent are hereby corrected as shown below:

Column 4, claim 2, line 52, "walls" should read -- guide means --.

Column 5, claim 2, line 13, after "cassette" insert -- when said cassette is partially inserted into said chamber, said levers and contact element being moved by engagement with said cassette --.

Column 5, claim 3, line 34, "walls" should read -- guide means --.

Column 6, claim 4, line 18, "walls" should read -- guide means --.

Signed and Sealed this

Thirtieth Day of May 1978

[SEAL]

Attest:

RUTH C. MASON
Attesting Officer

LUTRELLE F. PARKER
Acting Commissioner of Patents and Trademarks